US010539171B2

(12) United States Patent
Kowalenko et al.

(10) Patent No.: US 10,539,171 B2
(45) Date of Patent: Jan. 21, 2020

(54) ANCHOR FASTENER

(71) Applicant: GOOD EARTH LIGHTING, INC., Mount Prospect, IL (US)

(72) Inventors: Alexander Kowalenko, Inverness, IL (US); Christopher J. Serak, Mount Prospect, IL (US)

(73) Assignee: GOOD EARTH LIGHTING, INC., Mount Propect, IL (US)

( * ) Notice: Subject to any disclaimer, the term of this patent is extended or adjusted under 35 U.S.C. 154(b) by 185 days.

(21) Appl. No.: 15/871,841

(22) Filed: Jan. 15, 2018

(65) Prior Publication Data

US 2018/0156255 A1 Jun. 7, 2018

Related U.S. Application Data

(63) Continuation-in-part of application No. 15/006,953, filed on Jan. 26, 2016, now Pat. No. 9,869,336.

(Continued)

(51) Int. Cl.
| | |
|---|---|
| *F16B 13/08* | (2006.01) |
| *F16B 37/04* | (2006.01) |
| *F16B 25/00* | (2006.01) |
| *F16B 21/08* | (2006.01) |
| *F16B 25/10* | (2006.01) |
| *F16B 37/12* | (2006.01) |

(Continued)

(52) U.S. Cl.
CPC ...... *F16B 13/0891* (2013.01); *F16B 13/0825* (2013.01); *F16B 21/086* (2013.01); *F16B 25/0015* (2013.01); *F16B 25/0026* (2013.01); *F16B 25/0084* (2013.01); *F16B 25/103* (2013.01); *F16B 37/045* (2013.01); *F16B 37/127* (2013.01); *F21V 21/02* (2013.01); *F16B 4/004* (2013.01); *F16B 13/003* (2013.01); *F16B 13/08* (2013.01)

(58) Field of Classification Search
CPC ........ F16B 4/004; F16B 13/003; F16B 13/08; F16B 13/0825; F16B 13/0891; F16B 21/086; F16B 25/0015; F16B 25/0026; F16B 25/0084; F16B 25/103; F16B 37/045; F16B 37/127
USPC ........................................... 411/41, 533, 540
See application file for complete search history.

(56) References Cited

U.S. PATENT DOCUMENTS

| | | |
|---|---|---|
| 1,370,319 A | 3/1921 | Kennedy |
| 3,170,361 A | 2/1965 | Vaughn |

(Continued)

*Primary Examiner* — Roberta S Delisle
(74) *Attorney, Agent, or Firm* — Drinker Biddle & Reath LLP

(57) ABSTRACT

An anchor fastener is described. The anchor fastener includes a head, a generally cylindrical shaft extending from the head, a base at a distal end of the shaft, and at least one frangible portion configured to frangibly connect the shaft to the base. The shaft includes a helical thread that extends along an outer surface of the shaft towards the distal end of the shaft. The frangible portions are separable from the base and the shaft under application of a force to the shaft. The base includes a distal surface and an engagement portion configured to engage an object to be anchored to a mounting surface and configured to hold the anchor fastener to the object before installation of the shaft through the object and into the mounting surface. The base includes a thread guide configured to support the helical thread during installation of the shaft.

19 Claims, 13 Drawing Sheets

Related U.S. Application Data

(60) Provisional application No. 62/107,719, filed on Jan. 26, 2015.

(51) Int. Cl.
*F21V 21/02* (2006.01)
*F16B 13/00* (2006.01)
*F16B 4/00* (2006.01)

(56) References Cited

U.S. PATENT DOCUMENTS

| | | |
|---|---|---|
| 3,213,746 A | 10/1965 | Dwyer |
| 3,283,641 A | 11/1966 | Wagner |
| 3,641,866 A * | 2/1972 | Mortensen .............. F16B 13/00 411/41 |
| 3,651,734 A | 3/1972 | McSherry |
| 3,706,139 A | 12/1972 | Brumlik |
| 3,735,665 A | 5/1973 | Mortensen |
| 3,770,036 A | 11/1973 | Sherman |
| 3,869,959 A | 3/1975 | Moen |
| 3,959,853 A | 6/1976 | Talan |
| 4,309,136 A | 1/1982 | Talan |
| 4,601,625 A | 7/1986 | Ernst et al. |
| 4,770,583 A | 9/1988 | Lindberg |
| 4,878,791 A | 11/1989 | Kurihara et al. |
| 4,886,405 A | 12/1989 | Blomberg |
| 5,007,780 A | 4/1991 | Hoffmann et al. |
| 5,160,225 A | 11/1992 | Chern |
| 5,219,452 A | 6/1993 | Yamamoto |
| 5,226,768 A | 7/1993 | Speer |
| 5,234,299 A | 8/1993 | Giannuzzi |
| 5,267,423 A | 12/1993 | Giannuzzi |
| 5,275,519 A | 1/1994 | Hainke et al. |
| 5,308,203 A | 5/1994 | McSherry et al. |
| 5,536,121 A | 7/1996 | McSherry |
| 5,690,454 A | 11/1997 | Smith |
| 5,694,666 A | 12/1997 | Hamamoto |
| 5,833,415 A | 11/1998 | McSherry |
| 5,876,169 A | 3/1999 | Wrigley |
| 6,065,918 A | 5/2000 | Adams |
| 6,164,884 A | 12/2000 | Mayr |
| 6,186,716 B1 | 2/2001 | West et al. |
| 6,406,236 B1 | 6/2002 | Olson, Jr. |
| 6,494,653 B2 | 12/2002 | Remmers |
| 6,565,303 B1 * | 5/2003 | Riccitelli .............. E04D 3/3603 411/368 |
| 6,679,661 B2 | 1/2004 | Huang |
| 6,926,483 B2 | 8/2005 | Hesse et al. |
| 7,070,376 B1 | 7/2006 | Toback |
| 7,137,766 B2 | 11/2006 | Weinstein et al. |
| 7,237,994 B2 | 7/2007 | Hepworth |
| 7,261,505 B2 | 8/2007 | Ernst et al. |
| 7,290,972 B2 | 11/2007 | Gauthier |
| 7,465,137 B2 | 12/2008 | Dietz et al. |
| 7,604,446 B2 | 10/2009 | Fonti |
| 7,615,407 B1 | 11/2009 | Poddar et al. |
| 7,654,781 B2 | 2/2010 | McDuff et al. |
| 7,713,010 B2 | 5/2010 | Cheng |
| 7,748,089 B2 | 7/2010 | Jalbert et al. |
| 7,815,407 B2 | 10/2010 | Kucharyson |
| 7,934,895 B2 | 5/2011 | Ernst et al. |
| 8,057,147 B2 | 11/2011 | Ernst et al. |
| 8,070,405 B2 | 12/2011 | Hazout |
| 8,142,122 B2 | 3/2012 | McDuff et al. |
| 8,376,679 B2 | 2/2013 | Gaudron et al. |
| 8,404,065 B2 | 3/2013 | Miller |
| 8,602,703 B1 | 12/2013 | Rich |
| 8,740,527 B2 | 6/2014 | Cheng |
| 2005/0084360 A1 | 4/2005 | Panasik et al. |
| 2005/0271491 A1 | 12/2005 | Opper |
| 2006/0120822 A1 | 6/2006 | Kaye et al. |
| 2006/0165506 A1 | 7/2006 | Panasik et al. |
| 2006/0228188 A1 | 10/2006 | Hsu et al. |
| 2008/0292421 A1 | 11/2008 | Lin |
| 2012/0183372 A1 | 7/2012 | Roessner |
| 2012/0257944 A1 | 10/2012 | McDuff et al. |
| 2012/0328392 A1 | 12/2012 | Difante |
| 2014/0225486 A1 | 8/2014 | English |

* cited by examiner

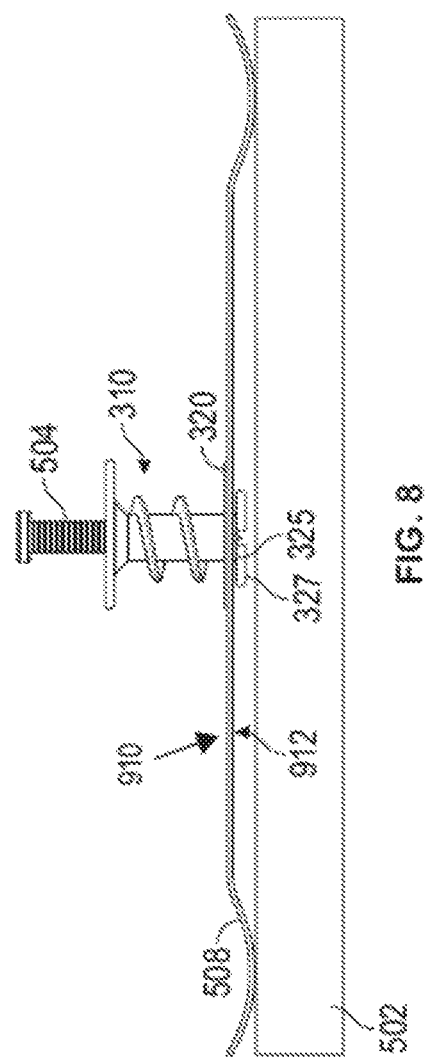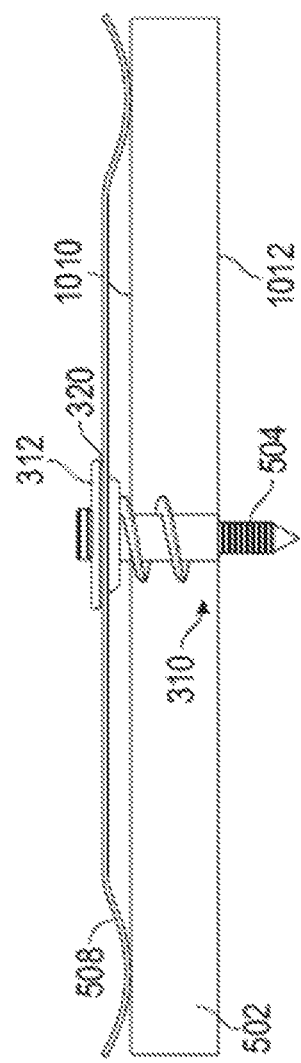

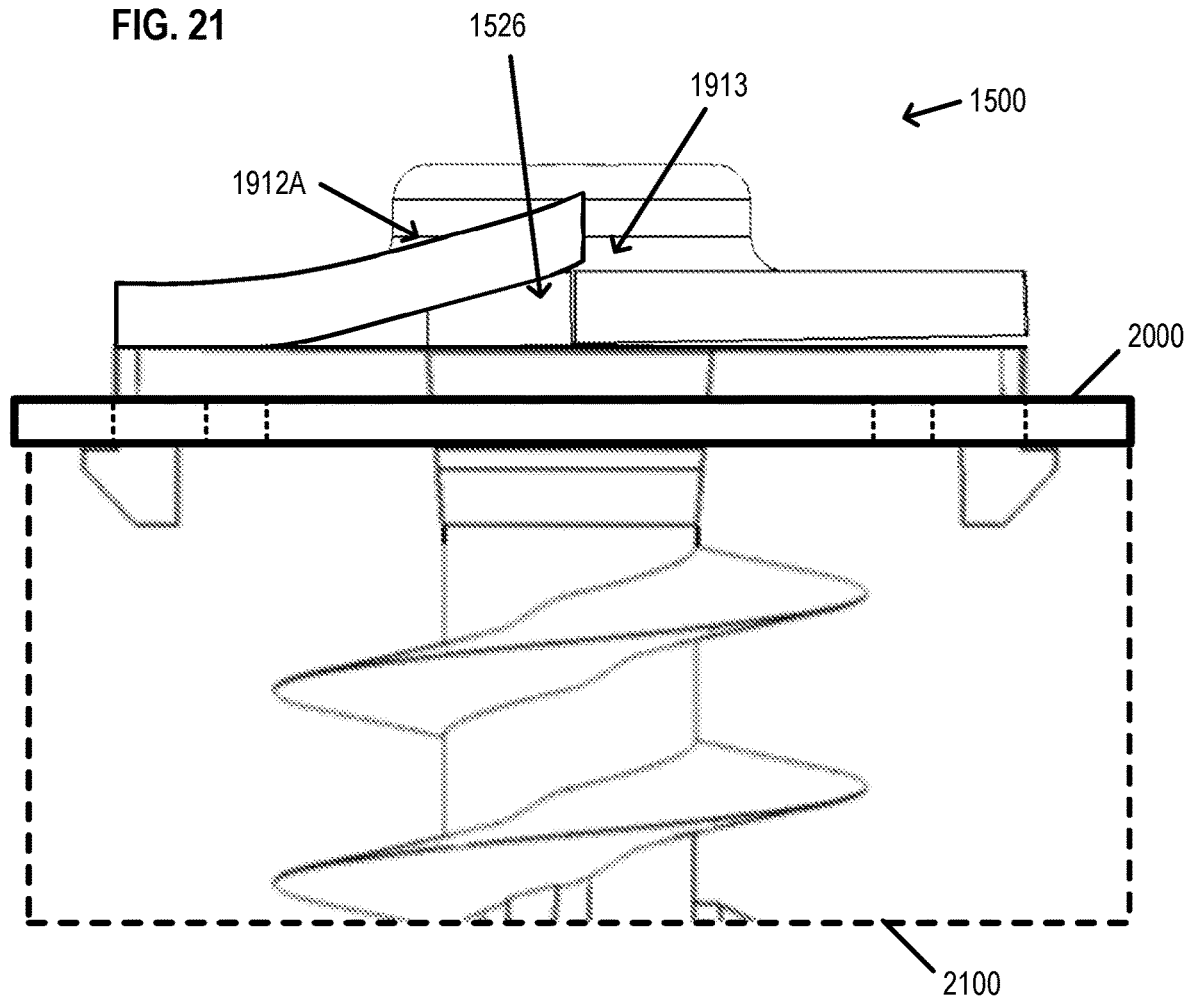

ANCHOR FASTENER

CROSS-REFERENCE TO RELATED PATENT APPLICATION

This application is a continuation-in-part of U.S. patent application Ser. No. 15/006,953, filed Jan. 26, 2016, now U.S. Pat. No. 9,869,336, entitled "Anchor Fastener," which claims the benefit of U.S. Provisional Patent Application No. 62/107,719, filed Jan. 26, 2015, entitled "Anchor Fastener," the disclosures of each of which is hereby expressly incorporated herein by reference in its entirety.

FIELD OF THE DISCLOSURE

The present disclosure relates generally to fastening devices and, more particularly, to anchor fasteners for drywall applications.

BACKGROUND

Current industry practices for installing a fixture (e.g., a lighting fixture, electrical fixture, etc.) to a mounting surface, such as a wall, ceiling, or other suitable surface, include attaching a portion of the fixture (e.g., a center portion) to an electrical junction box ("J-box") that is coupled with or contained within the mounting surface. For installation of some fixtures, for example, large and/or heavy fixtures, one or more additional fasteners are installed separately from the J-box to more securely attach the fixture to the mounting surface. For residential and other fixtures which are intended to be installed onto a surface made of drywall, plaster board, or other suitable material, the fixtures are configured to be attached with suitable fasteners and drywall anchors for additional support. For example, linear type lighting fixtures have an elongated shape that extends away from the J-box and are often configured to be attached to the mounting surface using screws and drywall anchors.

Drywall anchors are typically installed into the mounting surface before mounting the fixture. Installation of the drywall anchors typically involves i) measuring and marking locations of the drywall anchors on the mounting surface, ii) drilling pilot holes in the mounting surface for the drywall anchors, iii) installing the drywall anchors into the pilot holes, iv) installing the fixture to the j-box and orienting the fixture relative to the drywall anchors, and v) installing anchor screws through anchor holes in the fixture and into the drywall anchors. It is often difficult and/or time-consuming to pre-measure and locate the drywall anchor on the mounting surface so that the fixture is aligned properly in the installation of the fixture. For example, each of steps i) through v) may require a user to ascend and descend a ladder to reach the J-box, retrieve fasteners and/or tools, etc. This can result in the anchor holes of the fixture being misaligned with the drywall anchors. Some drywall anchors penetrate beyond a back or distal face of the mounting surface due to their length. In this case, the drywall anchor may not be fully installed if a stud or other support structure within the wall is present (e.g., it cannot penetrate into a stud or support structure) and the drywall anchor may tear a hole into the mounting surface when it hits the stud and deflects.

SUMMARY

In an embodiment, an anchor fastener includes a head, a generally cylindrical shaft extending from the head, a base at a distal end of the shaft, and at least one frangible portion configured to frangibly connect the shaft to the base. The shaft including a helical thread that extends along an outer surface of the shaft towards the distal end of the shaft. The at least one frangible portion is separable from at least one of the base and the shaft under application of a force to the shaft. The base includes a distal surface and an engagement portion configured to engage an object to be anchored to a mounting surface and configured to hold the anchor fastener to the object before installation of the shaft through the object and into the mounting surface. The base includes a thread guide configured to support the helical thread during installation of the shaft.

In another embodiment, an anchor fastener includes a head, a threaded shaft extending from the head having a self-drilling tip, a base at a distal end of the shaft, and at least one frangible portion configured to frangibly connect the shaft to the base. The shaft includes a helical thread that extends along an outer surface of the shaft towards the distal end of the shaft. The at least one frangible portion is separable from at least one of the base and the shaft under application of a force to the shaft. The base includes a distal surface and an engagement portion configured to engage an object to be anchored to a mounting surface and configured to hold the anchor fastener to the object before installation of the shaft through the object and into the mounting surface. The head includes a flexible portion configured to flex away from the base and in a direction perpendicular to the shaft. The base includes a protrusion that protrudes towards the flexible portion of the head. The flexible portion is configured to engage the protrusion and flex to resist and slow rotation of the shaft during installation of the shaft.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIG. 8 is a diagram illustrating a side view of the anchor fastener of FIG. 6 prior to installation in the mounting surface, according to an embodiment;

FIG. 9 is a diagram illustrating a side, cross-sectional view of the anchor fastener of FIG. 6 after installation in the mounting surface, according to an embodiment;

FIG. 21 is a diagram illustrating a partial, side view of the anchor fastener of FIG. 15 after installation, according to an embodiment.

DETAILED DESCRIPTION

Figure 1:
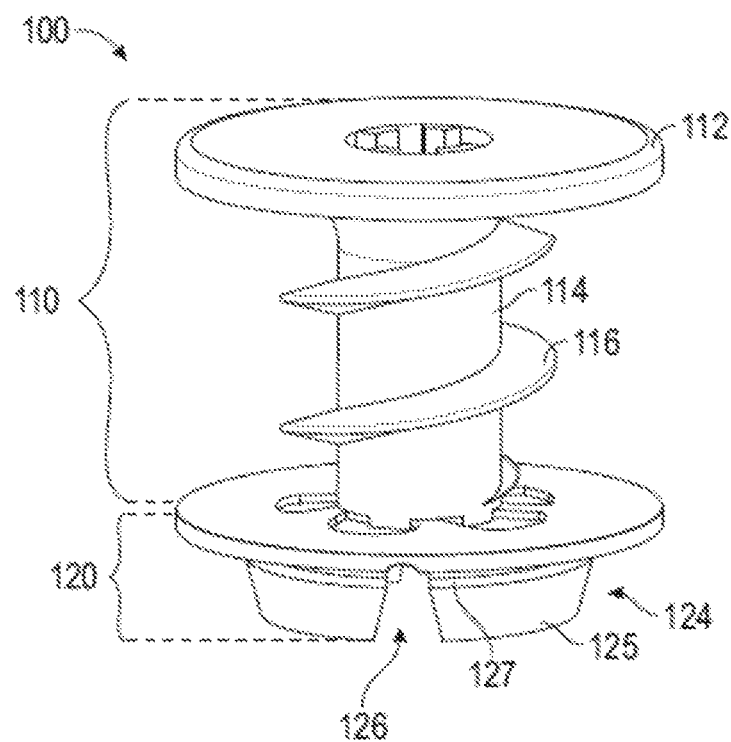
FIG. 1 is a diagram illustrating a side, perspective view of an anchor fastener, according to an embodiment.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Figure 2:
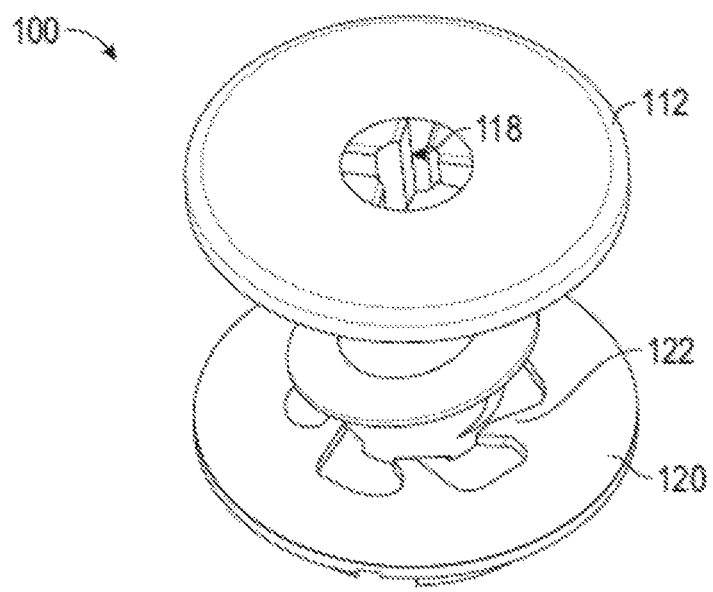
FIG. 2 is a diagram illustrating a top, perspective view of the anchor fastener of FIG. 1, according to an embodiment.
Figure 3:
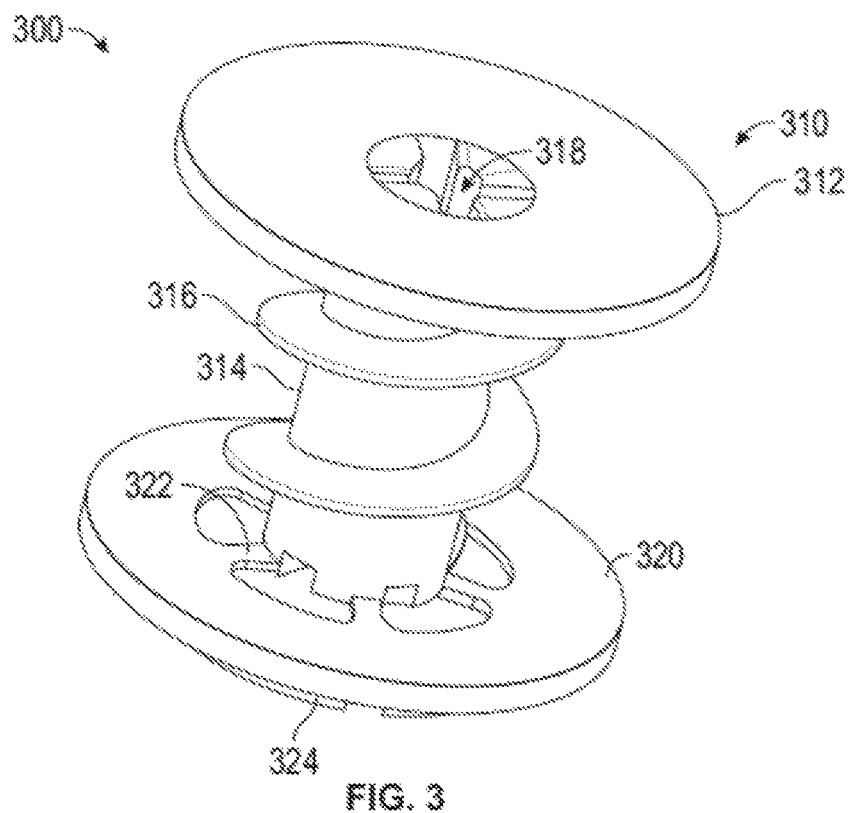
FIG. 3 is a diagram illustrating a side, perspective view of an anchor fastener, according to another embodiment.
Figure 4:
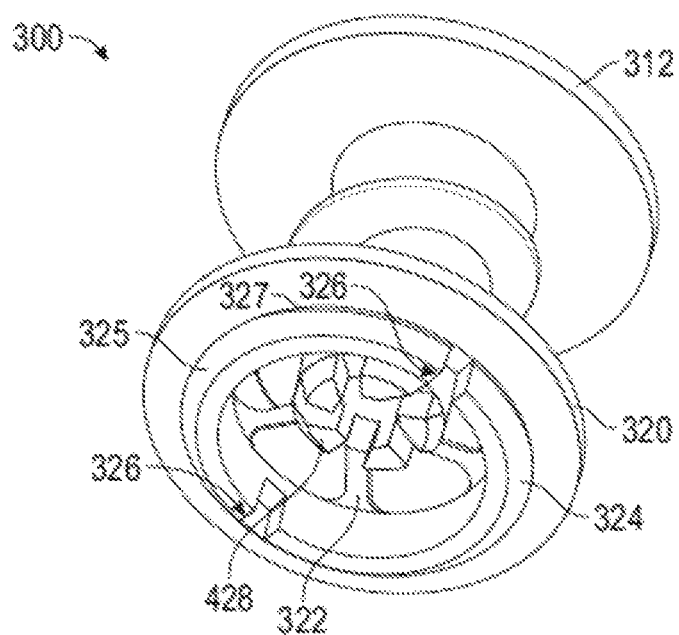
FIG. 4 is a diagram illustrating a bottom, perspective view of the anchor fastener of FIG. 3, according to an embodiment.

FIG. 1 is a diagram illustrating a side, perspective view of an anchor fastener 100, according to an embodiment. FIG. 2 is a diagram illustrating a top, perspective view of the anchor fastener 100 of FIG. 1. FIG. 3 is a diagram illustrating a side, perspective view of another embodiment of an anchor fastener 300. FIG. 4 is a diagram illustrating a bottom, perspective view of the anchor fastener 300 of FIG. 3. In various embodiments, the anchor fastener 100 or 300 is a pre-assembled anchor with a threaded fastener for installation of an object or fixture onto a mounting surface. Examples of mounting surfaces include, but are not limited to walls, ceilings, panels, or other suitable surfaces which are formed from drywall, wallboard, wood, plywood, fiberboard, particle board, composite material, or other suitable material. In the illustrated embodiments, the pre-assembled anchor is attached to an object or fixture prior to attachment of the fixture to a J-box and thus eliminates a need for pre-installation of a separate drywall anchor (e.g., marking and drilling pilot holes) when installing the fixture. Examples of fixtures include light fixtures, electrical fixtures, decorative fixtures, or other suitable fixtures. An attachment face of the object to be installed includes an anchor hole configured to receive the anchor fastener. The attachment face of the object is formed of sheet metal, plastic, or other suitable material. While the description herein refers to installation or attachment of a fixture, in other embodiments, the anchor fastener is used to attach an object to the mounting surface, such as a picture frame, mirror, wall hook, shelf, or other suitable object.

The anchor fastener 100, 300 includes an anchor body 110, 310 and an anchor base 120, 320. In some embodiments, the anchor fastener 100, 300 also includes a threaded fastener 504 (FIGS. 5, 6, 7, 8, 9, 10, and 11), such as a screw, bolt, or other suitable threaded fastener. The anchor body 110, 310 is removably attached to the anchor base 120, 320. In the illustrated embodiments, the anchor body 110, 310 is configured to break away or detach from the anchor base 120, 320 during installation of the anchor fastener 100, 300. The anchor base 120, 320 remains in place during at least an initial installation of the anchor fastener 100, 300.

In the illustrated embodiments, the anchor body 110, 310 includes an anchor head 112, 312 and a generally cylindrical anchor shaft 114, 314 extending from the anchor head 112, 312. The base 120, 320 is located at a distal end of the shaft 114, 314. The anchor shaft 114, 314 has a suitable length such that when the anchor body 110, 310 is installed (See FIG. 10) and passes through the anchor base 120, 320, the anchor shaft 114, 314 extends through a proximal face of the mounting surface but does not extend past a distal face of the mounting surface. In some embodiments, the anchor shaft 314 includes a tip 428 at its distal end which is configured for self-drilling of a hole in the mounting surface into which the anchor shaft is inserted. The anchor shaft 114, 314 includes one or more helical threads 116, 316 on an outer surface configured to engage the mounting surface and drive the anchor shaft 114, 314 into the mounting surface. The helical threads 116, 316 engage the drywall and hold the anchor shaft 114, 314 in place in the mounting surface after drilling.

In some embodiments, the anchor head 112, 312 and anchor shaft 114, 314 include a center channel 118, 318 configured to guide a threaded fastener into the mounting surface. In the illustrated embodiments, the center channel 118, 318 extends entirely through the anchor head 112, 312 and anchor shaft 114, 314. In other embodiments, the center channel 118, 318 extends a suitable distance from the anchor head 112, 312 through the anchor shaft 114, 314 towards the anchor base 120, 320 such that the threaded fastener can puncture or drill through a remainder of the anchor shaft 114, 314 into the mounting surface during installation (e.g., a user applying an installation force to the threaded fastener). In some embodiments, the anchor head 112, 312 is configured to receive a driving device (e.g., Phillips or flat-head screwdriver, hex bit, star bit, or other suitable drive mechanism) for removal of the anchor body after an initial installation. For example, the anchor head 112, 312 includes a socket or other receptacle.

In the embodiments shown in FIGS. 1, 2, 3, and 4, the anchor base 120, 320 is mechanically coupled with the anchor body 110, 310 by a plurality of bridges or webs 122, 322. The plurality of webs 122, 322 include a suitable number of webs (e.g., 2, 3, 4, 5, or more) that are configured with a suitable thickness such that an installation force provided by a user causes the webs 122, 322 to break away, shear, or otherwise separate from the anchor base, the anchor shaft, or both the anchor base and anchor shaft. For example, the anchor base is frangibly connected to a distal end of the anchor shaft 114, 314, and can be separated therefrom by application of at least one of a rotational force or a linear force. In some embodiments, an installation force causes i) a separation of the webs 122, 322, and ii) causes the self-drilling tip 428 to engage and drill into the mounting surface, and iii) installation of the anchor shaft 114, 314 into the mounting surface.

After the webs 122, 322 have separated, the anchor body 110, 310 is generally free to rotate within the anchor base 120, 320 and thus advance through the anchor base 120, 320 to screw into the mounting surface. The webs 122, 322 maintain the anchor body 110, 310 in a mounting position over the anchor hole of the fixture, for example, during manufacture and/or shipment of the fixture. In other embodiments, the anchor base 120, 320 is configured to removably engage the anchor body 110, 310, for example, using a snap-fit engagement, friction-fit or press-fit engagement, or other suitable engagement mechanism.

In various embodiments, the anchor base 120, 320 is a flat, annular ring configured to abut the object, for example, a proximal surface around an anchor hole of the object. The anchor base 120, 320 includes an engagement portion 124, 324 configured to attach the anchor fastener 100, 300 to the object, for example, to an anchor hole of a fixture. In the embodiment shown in FIGS. 1, 2, 3, and 4, the engagement portion 124, 324 includes an annular ridge 125, 325 having one or more slots 126, 326 configured to provide a snap-fit engagement with the anchor hole of the fixture. For example, the annular ridge 125, 325 elastically deforms inwardly toward a center axis of the anchor base 120, 320 (e.g., towards the center channel 118, 318) when inserted through the anchor hole of the fixture and generally "snaps back" to an original shape after passing through the anchor hole. In some embodiments, the annular ridge 125, 325 includes an outwardly facing lip 127, 327 (e.g., extending away from the center axis of the anchor base 120, 320) that engages a distal surface of the anchor hole. While only two slots 326 are shown in FIG. 4, the engagement portion 324 includes additional or fewer slots or alternatively, engagement tabs having suitable sizes, in other embodiments. In alternative embodiments, the engagement portion 324 is configured for a friction-fit or press-fit engagement to the fixture.

In some embodiments, the anchor fastener 100, 300 is formed from a plastic material, such as nylon, polyoxymethylene, polypropylene, acrylonitrile butadiene styrene (ABS), polycarbonate, or other suitable material. In other embodiments, the anchor fastener 100, 300 is formed from metal, such as brass, aluminum, or steel. As illustrated in the figures, the anchor base 120, 320 and anchor body are integrally formed as a single structure. In other embodiments, the anchor base 120, 320 and anchor body 110, 310 are formed separately and coupled with each other after their formation. In one such embodiment, the anchor base 120, 320 and anchor body are formed of different materials.

In various embodiments, the anchor fastener 100, 300 is configured to be installed into the mounting surface without a separate step of installing drywall anchors into the mounting surface prior to mounting the fixture. The anchor fastener 100, 300 is configured to be installed into the mounting surface after the fixture has been secured to the J-box and after proper alignment of the fixture. This helps to reduce and/or eliminate one or more of misalignment of anchor holes in the fixture with drywall anchors, misalignment of the fixture due to inaccurate measurements, and handling of multiple fasteners and tools by a user while on a ladder during installation. For example, some electrical fixtures include two or more drywall anchors, each drywall anchor having two parts: an anchor that is inserted into the drywall and a screw that attaches the fixture to the drywall anchor. In this example, there are four loose parts that could potentially be dropped (and lost) by a user from the top of the ladder during installation, resulting in an increased safety hazard of going up and down the ladder.

Figure 5:
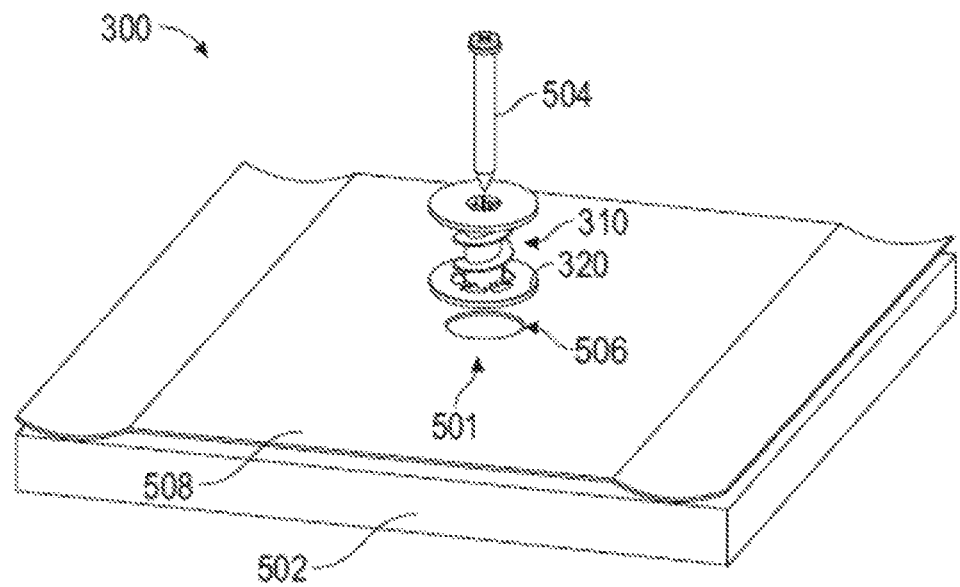
FIG. 5 is a diagram illustrating an exploded side, perspective view of the anchor fastener of FIG. 3 prior to installation in a mounting surface, according to an embodiment.

FIG. 5 is a diagram illustrating an exploded, side, perspective view of the anchor fastener 300 of FIG. 3 prior to installation at a location 501 in a mounting surface 502, according to an embodiment. As illustrated in FIG. 5, the anchor fastener 300 includes a threaded fastener 504, such as a screw, bolt, or other suitable fastener. As one example, the threaded fastener 504 is a #8 X 1.25" Pan Philips Type AB Self Tapping Screw. In some embodiments, the threaded fastener 504 is pre-installed within the center channel 318 of the anchor body 310. For example, the threaded fastener 504 is at least partially inserted into the center channel 318 of the anchor body 310. In some embodiments, the anchor base 320 is pre-installed within an anchor hole 506 of a fixture 508 which is to be attached to the mounting surface 502.

In some embodiments, the anchor body 310 and threaded fastener 504 are configured to be installed into a mounting surface 502 with a wall support (e.g., a stud, brace or other suitable structure, not shown). For example, the anchor shaft 314 has a suitable length (e.g., ½" or ¾") such that when the anchor body 310 is installed (See FIG. 10) and passes through the anchor base 320, the anchor shaft 314 does not extend past a distal face of the mounting surface 502 while the threaded fastener 504 (e.g., a self-tapping screw) screws itself into the stud and thus provides additional support.

In some embodiments, the threaded fastener 504 and center channel 318 are configured to transfer at least a portion of a rotational force imparted on the threaded fastener 504 to the anchor body 310. For example, a rotational force applied to the threaded fastener 504 by a user with a screw driver or other driving device is transferred to the anchor body 310 through a friction fit, press fit, threaded engagement fit, or other suitable engagement mechanism. Accordingly, as the user drives the threaded fastener 504 into the mounting surface 502, and optionally, into a stud (not shown) behind the mounting surface 502, the rotation of the threaded fastener 504 is transferred to the anchor body 310, causing the tip 428 and/or anchor threads 316 to engage and install the anchor body 310 into the mounting surface 502.

Figure 6:
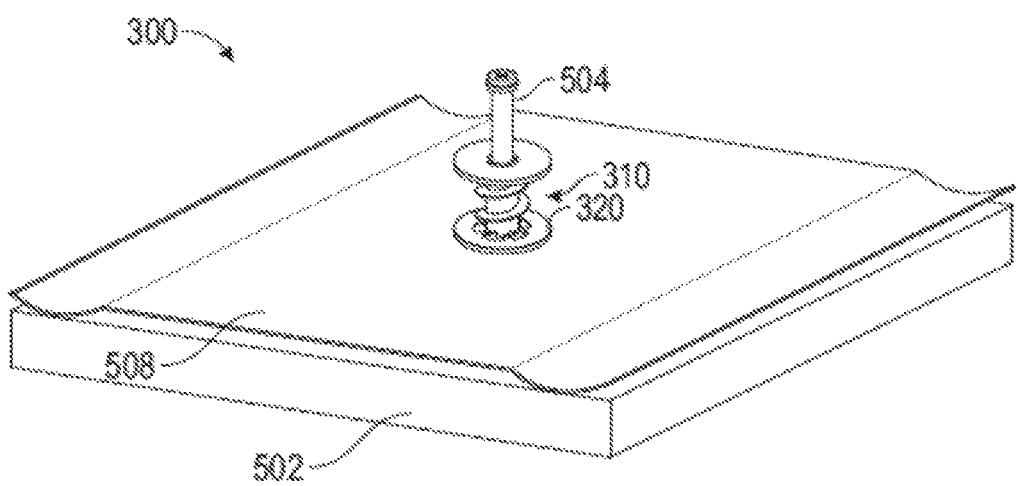
FIG. 6 is a diagram illustrating a side, perspective view of the anchor fastener of FIG. 3 prior to installation in the mounting surface, according to an embodiment.
Figure 7:
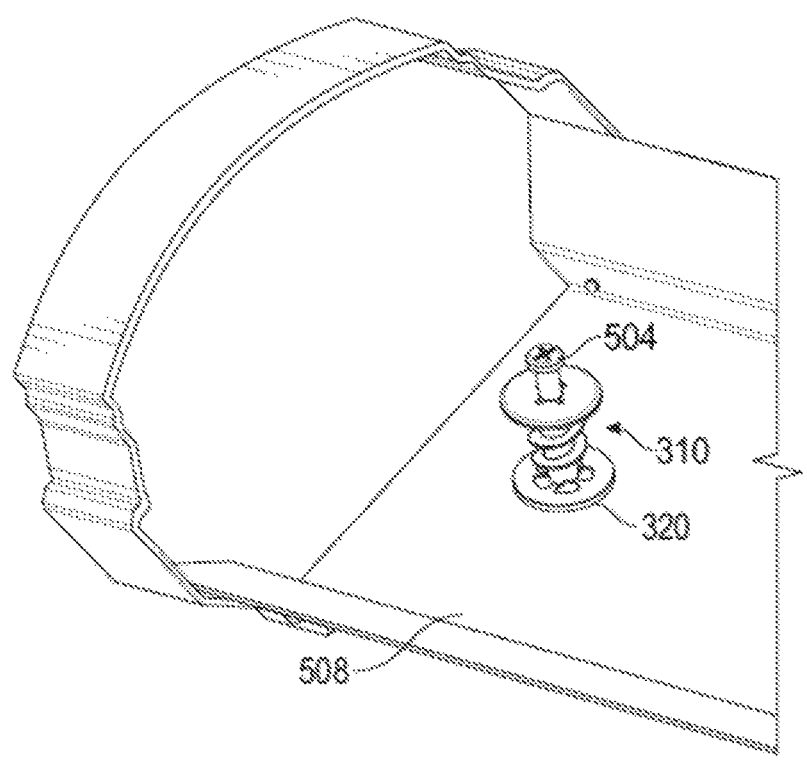
FIG. 7 is a diagram illustrating another top, perspective view of the anchor fastener of FIG. 6 prior to installation in the mounting surface, according to an embodiment.

FIG. 6 is a diagram illustrating a side, perspective view of the anchor fastener 300 prior to installation in the mounting surface 502, according to an embodiment. FIG. 7 is a diagram illustrating another top, perspective view of the anchor fastener 300 of FIG. 6 prior to installation in the mounting surface 502. FIG. 8 is a diagram illustrating a side view of the anchor fastener 300 of FIG. 6 prior to installation in the mounting surface 502. The anchor fastener 300 is shown with the anchor base 320 coupled to the fixture 508 and the threaded fastener 504 partially inserted into the center channel 318 of the anchor body 310. In some embodiments, the anchor fastener 300 is pre-installed within the fixture 508 as shown in FIG. 6 prior to a sale or shipment of the fixture 508. In the embodiment shown in FIG. 6, the base 320 abuts a proximal surface 910 around the anchor hole 506 of the object 508, the annular ridge 325 extends through the anchor hole 506, and the outwardly facing lip 327 engages a distal surface 912 of the anchor hole 506.

A user performs an installation of the anchor fastener 300 by engaging a driver device (e.g., a screw driver) with a head of the threaded fastener 504. The user provides an installation force to the driver device, for example, pushing and/or rotating the driver device to cause the webs 322 to break.

After the webs 322 have broken, the installation force causes the threaded fastener 504 and the anchor body 310 to rotate. Rotation of the anchor body 310 causes the self-drilling tip 428 of the anchor shaft 314 to drill into the mounting surface 502. In some embodiments, the threaded fastener 504 is partially inserted or screwed into the mounting surface 502 before the webs 322 are separated. For example, the threaded fastener 504 is inserted through the center channel 318 and into the mounting surface 502, receives an installation force, and advances through the center channel 318 of the shaft during installation of the anchor fastener 300 until a head of the threaded fastener 504 engages the anchor head 312 and stops the advance of the threaded fastener 504 through the center channel 318. Upon engagement of the head of the threaded fastener 504 and the anchor head 312, the installation force is transferred to the anchor head 312 and the webs 322 are separated, as described above.

FIG. 9 is a diagram illustrating a side, cross-sectional view of the anchor fastener 300 of FIG. 6 after installation in the mounting surface 502, according to an embodiment. As illustrated in FIG. 9, the anchor shaft 314 is separated from the webs 322 of the anchor base 320 and secured into the mounting surface 502 by the helical threads 316. The anchor shaft 314 extends through a proximal face 1010 of the mounting surface but does not extend past a distal face 1012 of the mounting surface 502. The anchor head 312 abuts the anchor base 320 and prevents insertion of the anchor body 310 beyond the distal face 1012 of the mounting surface 502. In some embodiments, a lateral dimension of the anchor head 312 is greater than a maximum lateral dimension of the anchor shaft 314, which limits penetration of the anchor fastener 300 into the mounting surface 502. In an embodiment, an installation force suitable for driving the threaded fastener 504 into a stud or wall support structure is sufficient to break the webs 322 that couple the anchor base 320 to the anchor body 310.

In some embodiments, the threaded fastener 504 is removable after installation, for example, using a screwdriver, driving device, or other suitable extraction tool. The anchor body 310 is removable from the mounting surface, for example, using a screwdriver or other suitable extraction tool. In some embodiments, the threaded fastener 504 and the anchor body 310 have a same socket or receptacle configuration (e.g., Phillips, hex, etc.) or are otherwise configured for removal using a same tool.

Figure 10:
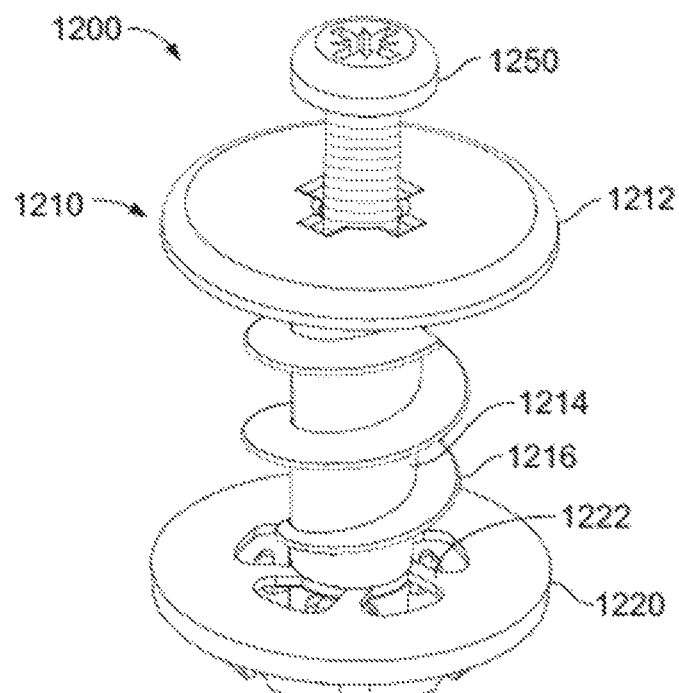
FIG. 10 is a diagram illustrating a side, perspective view of an anchor fastener with a threaded fastener, according to another embodiment.
Figure 11:
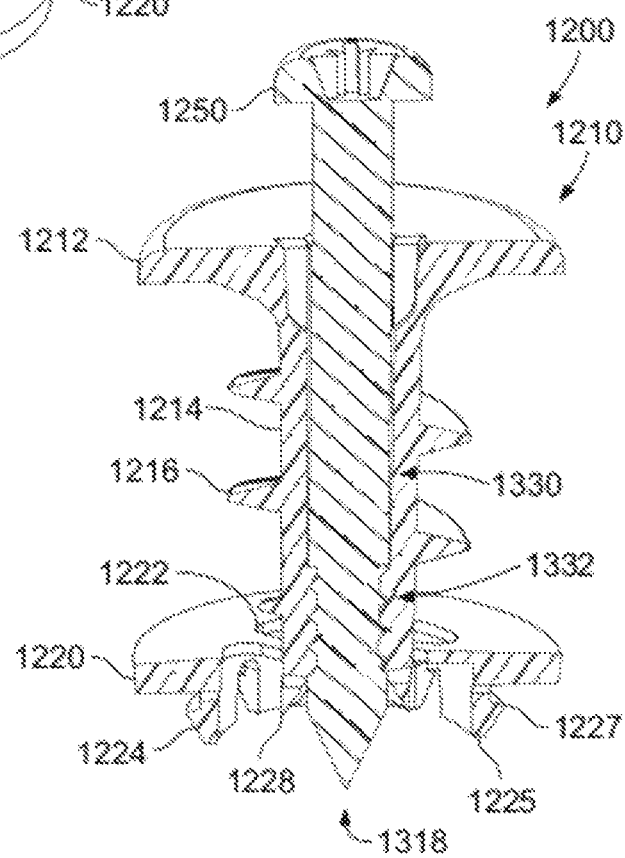
FIG. 11 is a diagram illustrating a side, perspective view, in cross-section, of the anchor fastener and threaded fastener of FIG. 10, according to an embodiment.
Figures 12, 13:
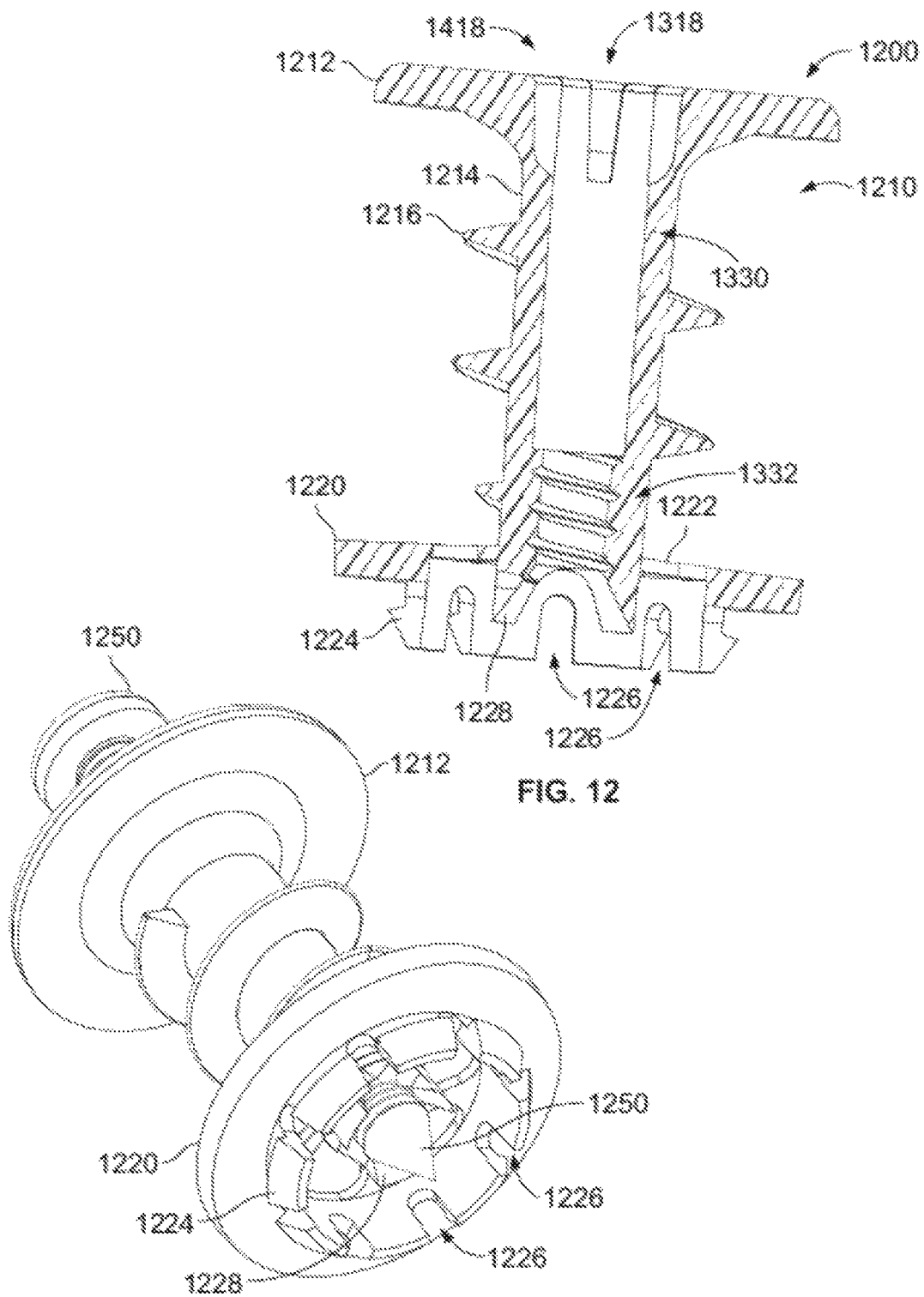
FIG. 12 is a diagrams illustrating a side, perspective view, in cross-section, of the anchor fastener of FIG. 10, according to an embodiment.
FIG. 13 is a diagram illustrating a bottom, perspective view of the anchor fastener and threaded fastener of FIG. 10, according to an embodiment.
Figure 14:
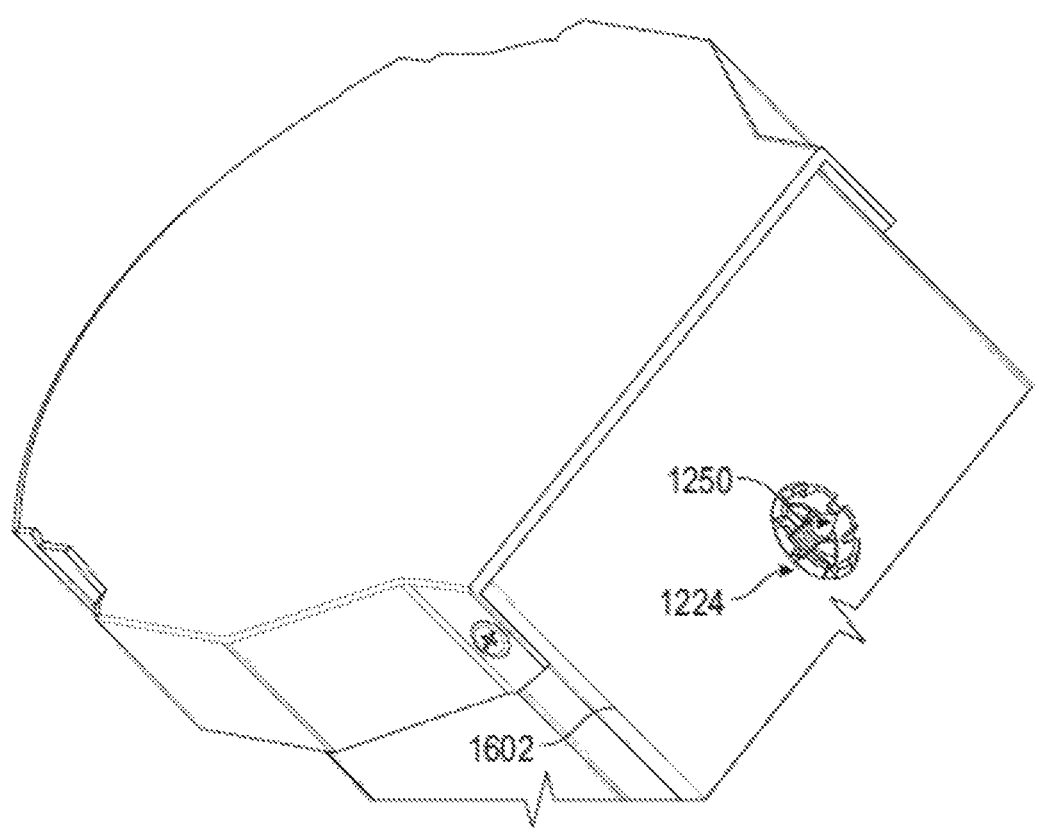
FIG. 14 is a diagram illustrating a bottom, perspective view of the anchor fastener and threaded fastener of FIG. 10 prior to installation in a mounting surface, according to an embodiment.

FIG. 10 is a diagram illustrating a side, perspective view of an anchor fastener 1200 with a threaded fastener 1250, according to another embodiment. FIG. 11 is a diagram illustrating a side, perspective view, in cross-section, of the anchor fastener 1200 and threaded fastener 1250 of FIG. 10, according to an embodiment. FIG. 12 is a diagram illustrating a side, perspective view, in cross-section, of the anchor fastener 1200 of FIG. 10, according to an embodiment. FIG. 13 is a diagram illustrating a bottom, perspective view of the anchor fastener 1200 and threaded fastener 1250 of FIG. 10, according to an embodiment. FIG. 14 is a diagram illustrating a bottom, perspective view of the anchor fastener 1200 and threaded fastener 1250 of FIG. 10 coupled to a fixture 1602 prior to installation in a mounting surface (not shown), according to an embodiment.

The anchor fastener 1200 includes an anchor body 1210 and an anchor base 1220 at a distal end of the anchor body 1210. The anchor body 1210 includes an anchor head 1212 and an anchor shaft 1214 having one or more helical threads 1216 and a self-drilling tip 1228. The anchor base 1220 is coupled to the anchor shaft 1214 of the anchor body 1210 by one or more frangible webs 1222. The anchor body 1210 includes a center channel 1318 configured to guide the threaded fastener 1250 into the mounting surface.

In the illustrated embodiment, the center channel 1318 includes a receptacle 1418, an unthreaded portion 1330, and a threaded portion 1332. The receptacle 1418 is configured to receive a driving device (e.g., Phillips or flat-head screwdriver, hex key or hex bit, star bit, or other suitable drive mechanism) for removal of the anchor body 1210 after an initial installation. For example, the receptacle 1418 is a Phillips compatible slot, a flat-head slot, or a hexagonal shape. As another example, the receptacle 1418 has a star shape having four, five, six, or another suitable number of points. The threaded portion 1332 provides a threaded engagement fit with the threaded fastener 1250 to secure the threaded fastener 1250 prior to installation. In some embodiments, the unthreaded portion 1330 provides a reduced friction area within the center channel 1318 to reduce an installation force required to install the threaded fastener 1250. In other embodiments, the unthreaded portion 1330 is omitted and the threaded portion 1332 extends along an entire length, or substantially the entire length, of the center channel 1318.

The anchor base 1220 is a flat, annular ring and includes an engagement portion 1224 configured to attach the anchor fastener 1200 to the fixture 1602. In the embodiment shown in FIGS. 10, 11, 12, 13, and 14, the engagement portion 1224 includes an annular ridge 1225 having one or more slots 1226 configured to provide a snap-fit engagement with an anchor hole (not shown) of the fixture 1602. In some embodiments, the annular ridge 1225 includes an outwardly facing lip 1227 that engages a distal surface of the anchor hole.

Figure 15:
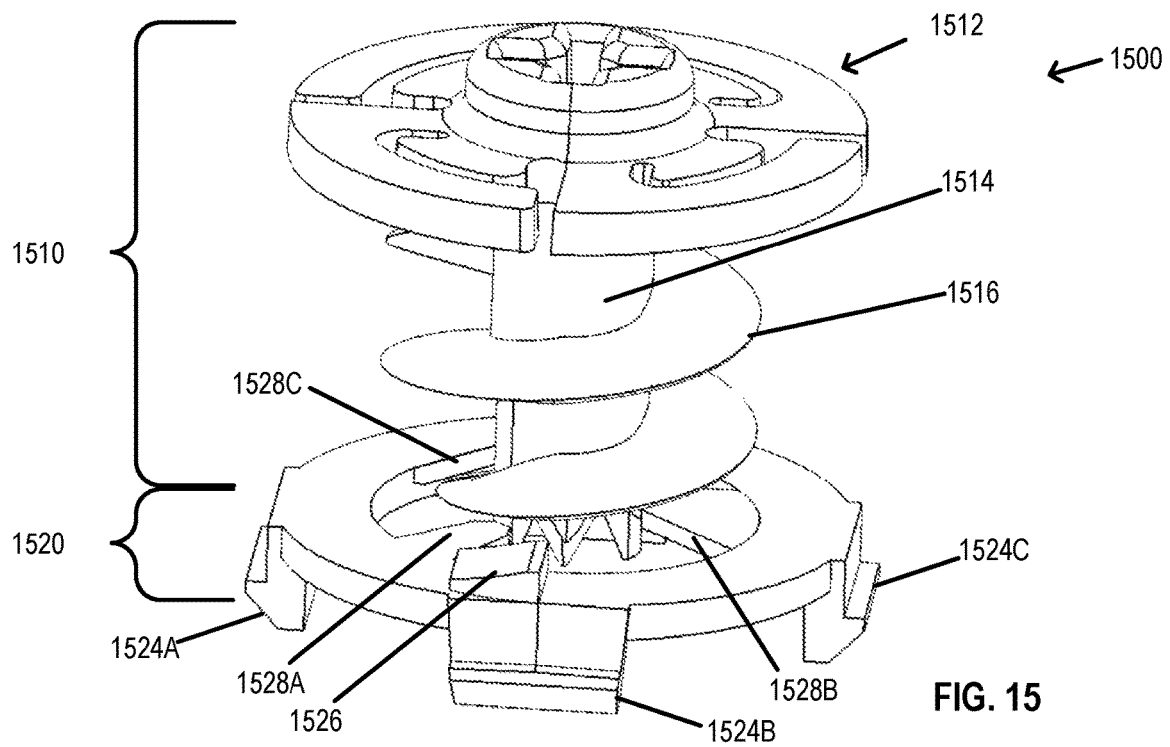
FIG. 15 is a diagram illustrating a side, perspective view of an anchor fastener, according to another embodiment.
Figure 16:
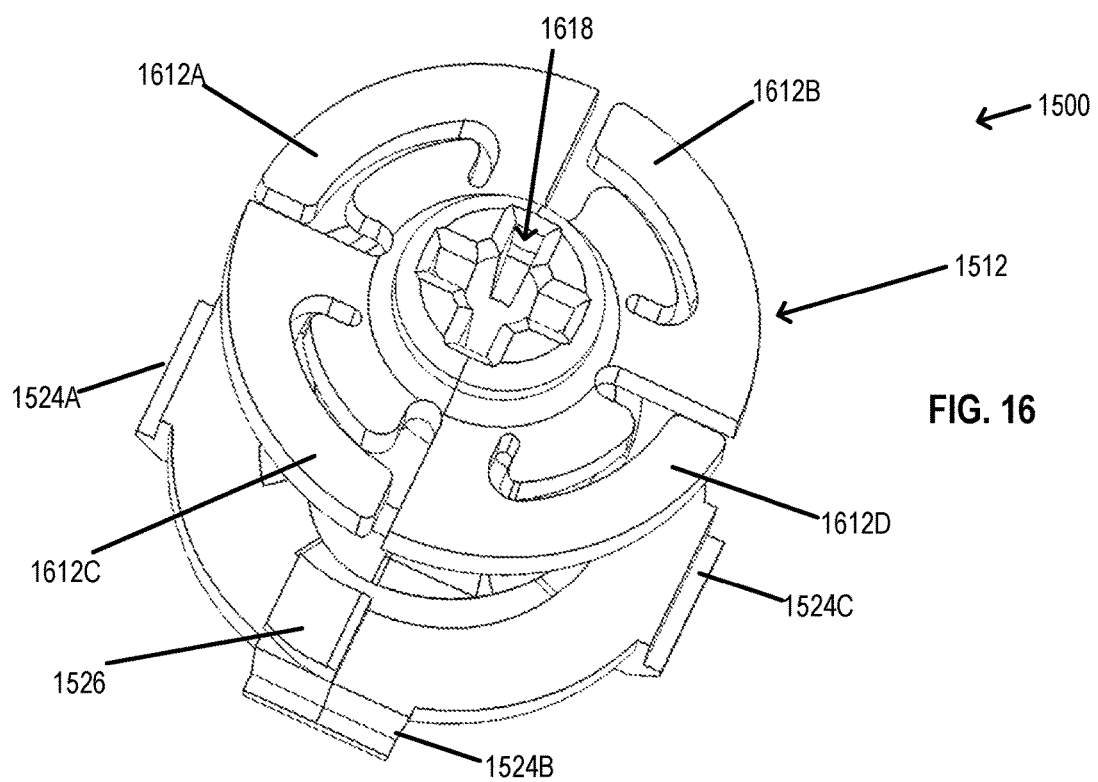
FIG. 16 is a diagram illustrating a top, perspective view of the anchor fastener of FIG. 15.
Figure 17:
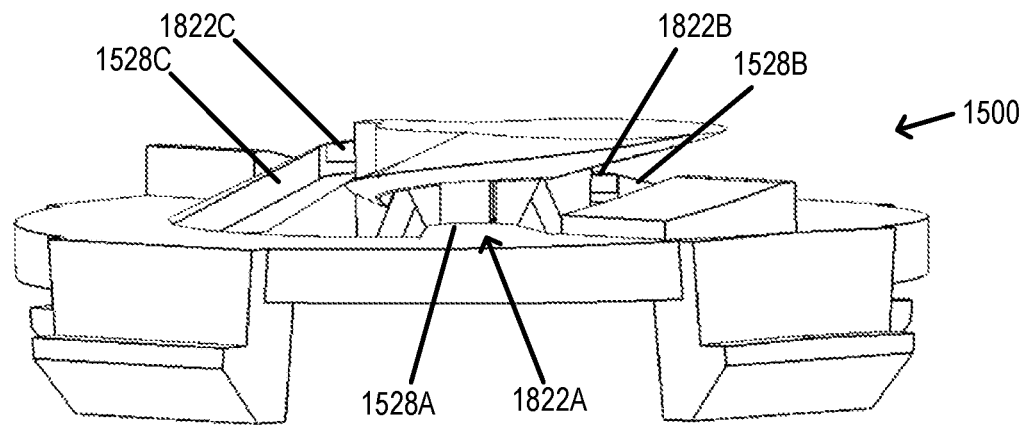
FIG. 17 is a diagram illustrating a partial, side, perspective view of the anchor fastener of FIG. 15.
Figure 18:
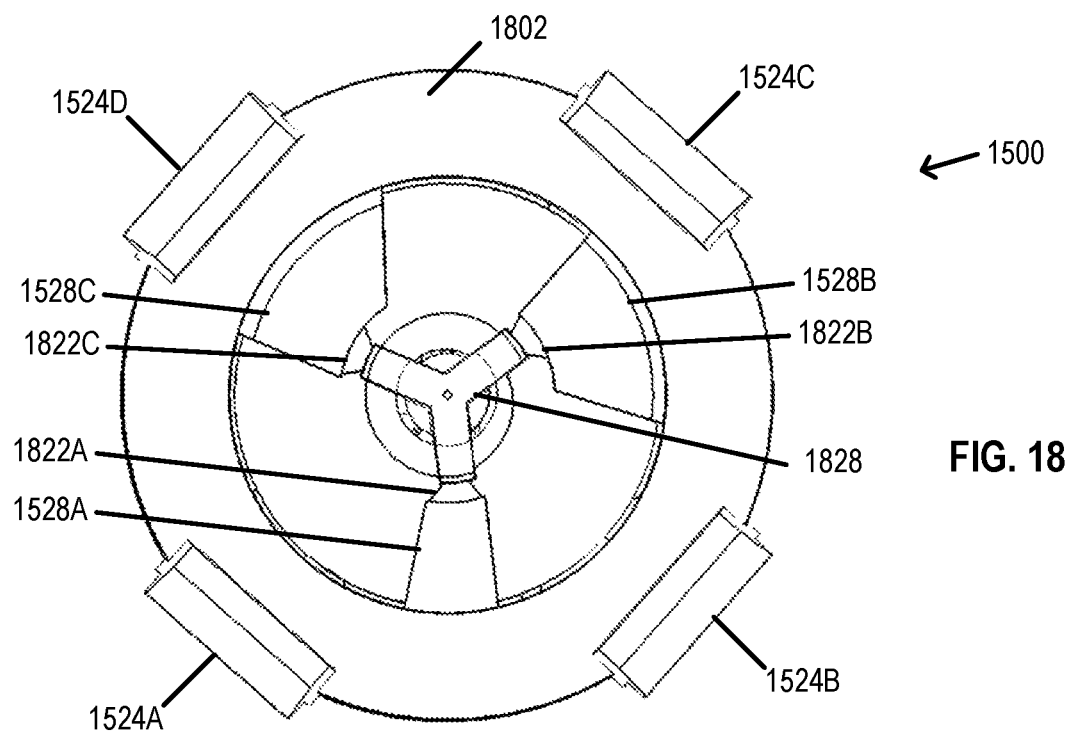
FIG. 18 is a diagram illustrating a bottom view of the anchor fastener of FIG. 15.
Figure 19:
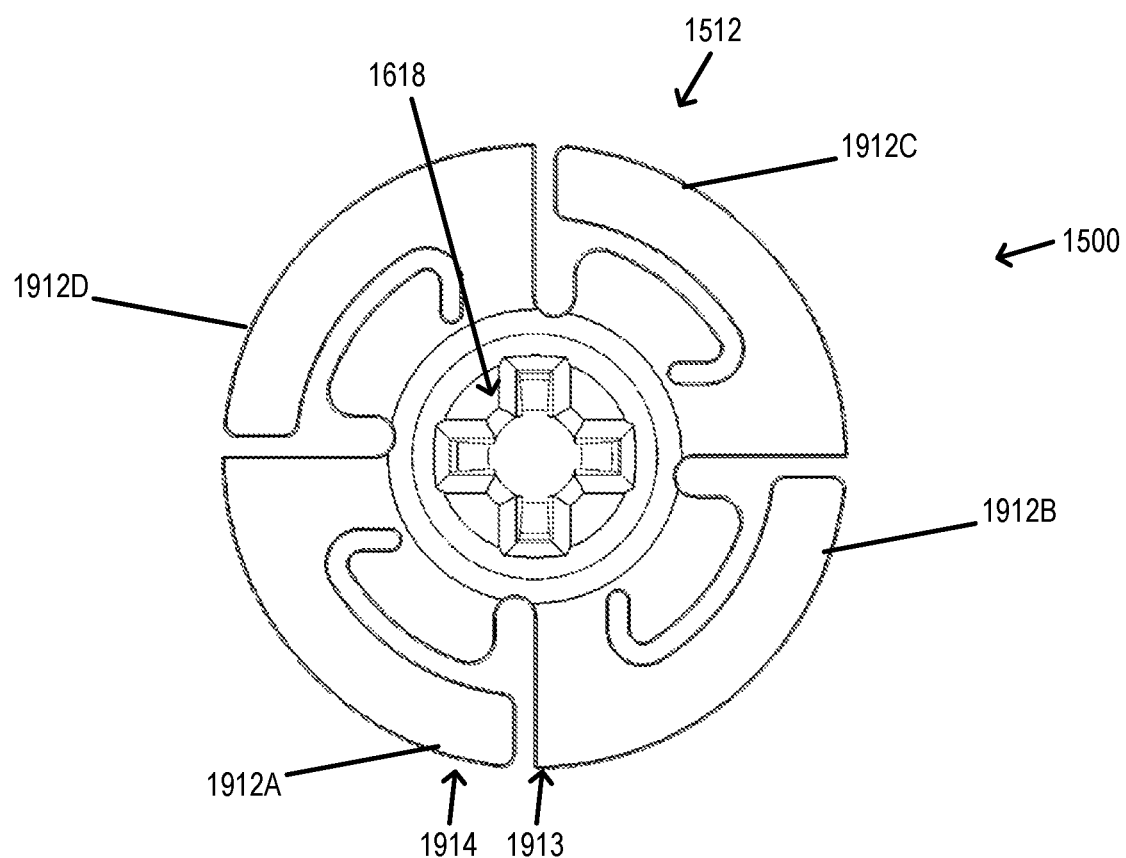
FIG. 19 is a diagram illustrating top view of the anchor fastener of FIG. 15.
Figure 20A:
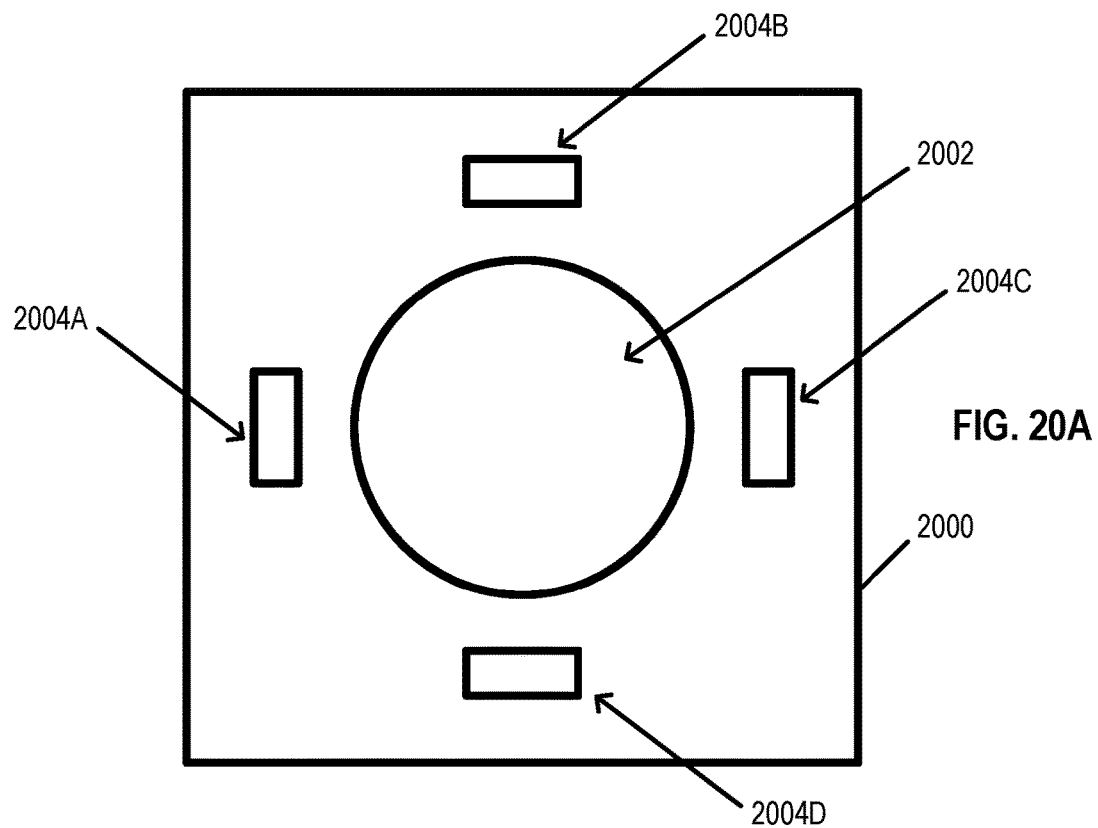
FIG. 20A is a diagram illustrating a bottom view of a distal surface of an object to be anchored, according to an embodiment.
Figure 20B:
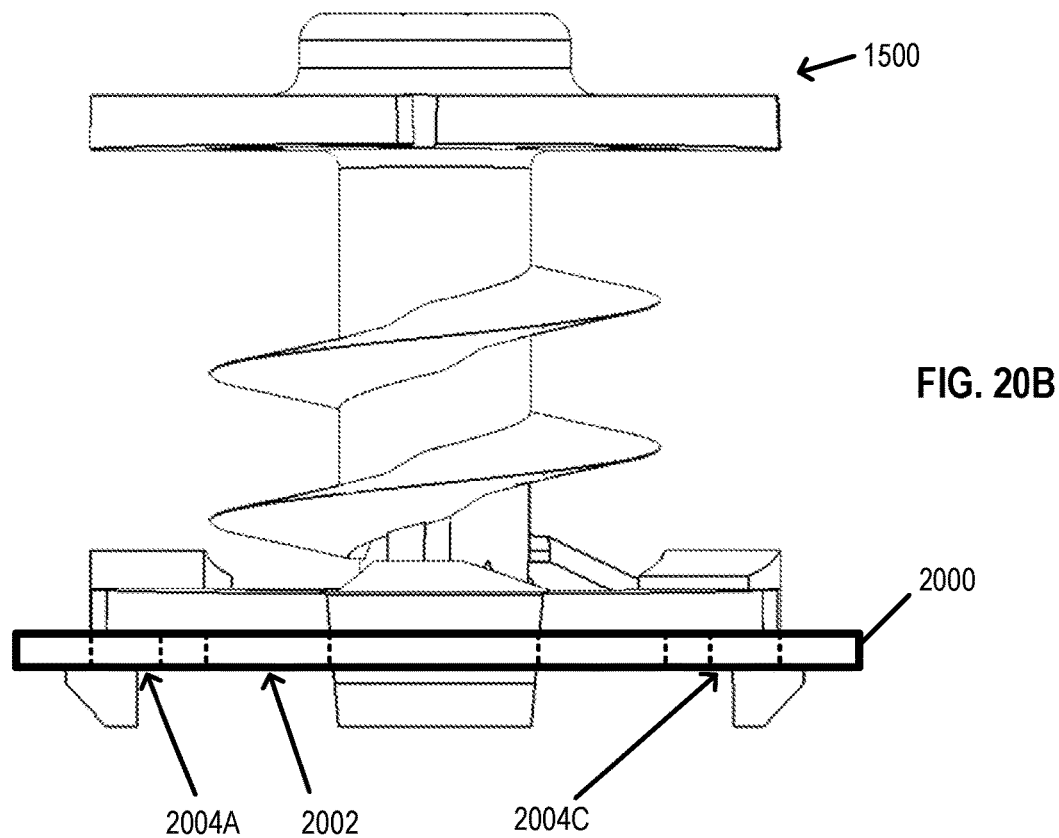
FIG. 20B is a diagram illustrating a bottom view of the distal surface of FIG. 20A with the anchor fastener of FIG. 15.

FIG. 15 is a diagram illustrating a side, perspective view of an anchor fastener 1500, according to an embodiment. FIG. 16 is a diagram illustrating a top, perspective view of the anchor fastener 1500. FIG. 17 is a diagram illustrating a partial, side, perspective view of the anchor fastener 1500. FIG. 18 is a diagram illustrating a bottom view of the anchor fastener 1500. FIG. 19 is a diagram illustrating top view of the anchor fastener 1500. FIG. 20A is a diagram illustrating a bottom view of a distal surface of an object to be anchored, according to an embodiment. FIG. 20B is a diagram illustrating a bottom view of the distal surface of FIG. 20A with the anchor fastener of FIG. 15. FIG. 21 is a diagram illustrating a partial, side view of the anchor fastener of FIG. 15 after installation, according to an embodiment.

The anchor fastener 1500 is similar to the anchor fastener 100 and anchor fastener 300, with one or more differences and features described below. In various embodiments, the anchor fastener 1500 is a pre-assembled anchor for installation of an object or fixture onto a mounting surface. In the embodiments shown in FIGS. 15-19, the anchor fastener 1500 omits the threaded fastener (e.g. fastener 504) utilized by the anchor fasteners 100 and 300.

The anchor fastener 1500 includes an anchor body 1510, an anchor base 1520, and at least one frangible portion 1822. The anchor body 1510 includes a head 1512 and a generally cylindrical shaft 1514 that extends from the head 1512. A helical thread 1516 of the shaft 1514 extends along an outer surface of the shaft 1514 towards the distal end of the shaft. The shaft 1514 includes a tip 1828 at its distal end which is configured for self-drilling of a hole in the mounting surface 2100 into which the shaft 1514 is to be installed.

The anchor body 1500 is removably attached to the anchor base 1520 by the frangible portion 1822. For example, the frangible portion 1822 is configured to frangibly connect the shaft 1514 to the base 1520 and thus, to break away or detach from the anchor base 1520 during installation of the shaft 1514 into the mounting surface 2100. In other words, the frangible portion 1822 is separable from at least one of the base 1520 and the shaft 1514 under application of a force to the shaft 1514. In one scenario, a user provides at least a rotational installation force to the shaft 1514 by turning a screwdriver, screw gun, or other suitable driving device with a suitable bit (e.g., Phillips or flat-head screwdriver, hex bit, star bit) placed into a corresponding receptacle 1618, causing the frangible portions 1822 to break free. In another scenario, a user pushes along a central axis of the shaft 1514 to break the frangible portions free before providing the rotational installation force. In this scenario, the user provides the rotational installation force immediately after breaking the frangible portions. Advantageously, the same installation force that installs the shaft into the mounting surface (i.e., a rotational force) breaks the frangible portions free, which simplifies installation of the anchor fastener 1500. In other words, the rotational installation force causes i) a separation of the at least one frangible portion 1822, ii) the self-drilling tip 1828 to engage and drill into the mounting surface 2100, and iii) installation of the shaft 1514 into the mounting surface 2100.

The anchor base 1520 includes a distal surface 1802 and an engagement portion 1524 configured to engage an object 2000 (FIG. 20) to be anchored to a mounting surface 2100 (FIG. 21) and configured to hold the anchor fastener 1500 to the object 2000 before installation of the shaft 1514 through the object 2000 and into the mounting surface 2100. The engagement portion 1524 provides a snap-fit engagement with the object 2000, in a manner similar to the engagement portion 124. The distal surface 1802 of the base 1520 extends away from a center axis of the shaft 1514 beyond an anchor hole 2002 (FIG. 20) of the object 2000 and is configured to abut a proximal surface of the object around the anchor hole.

The base 1520 includes a thread guide 1528 configured to support the helical thread 1516 during installation of the shaft 1514. The thread guide 1528 is configured to stabilize a rotational axis of the shaft 1514 during installation of the shaft 1514 into the mounting surface 2100. In other words, the thread guide 1528 holds the body 1510 in a suitable position while the body 1510 is installed and screwed into the mounting surface 2100. In the embodiment shown in FIGS. 15-19, the thread guide 1528 includes a plurality of engagement surfaces 1528A, 1528B, and 1528C that engage the helical thread 1516 during installation.

In some embodiments, the engagement surfaces 1528A, 1528B, and 1528C are formed at different distances from the base 1520, for example, at different distances according to a thread pitch of the helical thread 1516. In other words, the engagement surfaces 1528 are configured as threads of a nut that guide the threaded shaft 1514 during installation to keep the shaft 1514 suitably aligned with the mounting surface 2100 (e.g., perpendicular or normal to the mounting surface). In the embodiment shown in FIGS. 15-19, the plurality of engagement surfaces 1528 include at least three engagement surfaces 1528A, 1528B, and 1528C that extend inwards from the base 1520 towards respective frangible portions 1822A, 1822B, and 1822C that frangibly connect the shaft 1514 to the base 1520. In other embodiments, the engagement surfaces 1528 include two, four, five, or more engagement surfaces. In an embodiment, the thread guides 1528 are configured to be flex downwards (towards the mounting surface 2100) when a predetermined amount of force is applied. For example, the thread guides 1528 flex downwards and towards the center of the anchor hole when the head 1512 presses an upper surface of the thread guides 1528 so that the thread guides 1528 do not prevent shaft 1514 from being fully installed into the mounting surface 2100.

The anchor fastener 1500 includes the engagement portion 1524 which is configured to prevent rotation of the base 1520 relative to the object 2000 to be anchored. In the embodiment shown in FIGS. 15-19, the engagement portion 1524 includes flat portions 1524A, 1524B, 1524C, 1524D that engage corresponding notches 2004A, 2004B, 2004C, and 2004D in the object 2000 to be anchored. Although four notches 2004 are shown, in other embodiments, the engagement portion 1524 includes one, two, three, five, or more flat portions. In still other embodiments, the engagement portion 1524 has a different suitable shape that restricts rotation of the base 1520 within the object 2000 to be anchored (e.g., a square shape, hexagon shape). In the embodiment shown in FIG. 20A, the notches 2004 are formed separately from the anchor hole 2002. In other embodiments, one or more of the notches 2004 are integrally formed with the anchor hole 2002. In an embodiment, for example, the anchor hole 2002 and the notches 2004 are formed as a single hole within the object 2000.

In some embodiments, the head 1510 includes a flexible portion 1912 configured to flex and resist rotation of the shaft 1514, for example, to reduce a harsh "stop" sensation felt by the user when the head 1512 reaches the base 1520 during installation. In an embodiment, the flexible portion 1912 includes elongated circumferential fingers 1912A, 1912B, 1912C, and 1912D that flex during installation. In an embodiment, the flexible portion 1912 flexes about the rotational axis of the shaft 1514, for example, so that a tip 1914 of a the finger 1912A flexes towards a "knuckle" 1913 of an adjacent finger 1912B. In another embodiment, the flexible portion 1912 flexes away from a proximal surface of the base 1520 and in a direction parallel to the shaft 1514. The base 1520 includes one or more protrusions 1526 that protrude towards the flexible portion 1912. The flexible portion 1912 is configured to engage the protrusion 1526 and flex to resist and slow rotation of the shaft 1514. In an embodiment, the anchor fastener 1500 includes four elongated circumferential fingers 1912A, 1912B, 1912C, and 1912D arranged in a plane perpendicular to the shaft 1514 where the fingers rotate within the plane.

In an embodiment, the protrusion 1526 is configured to prevent further rotation of the shaft 1514 at a predetermined installation depth of the shaft 1514. In some embodiments, the protrusion 1526 prevents further rotation of the shaft 1514 to prevent the helical thread 1516 from "stripping out" the mounting surface 2100. For example, where the mounting surface 2100 is drywall (or other relatively soft material), additional rotations of the helical thread 1516 begin to weaken and break up the drywall, reducing the effectiveness of the drywall anchor 1500.

In an embodiment, a height of the thread guides 1528 is set based on a height of the protrusion 1526 from the base 1520 and an amount of rotation of the flexible portions 1912 during the installation so that the elongated circumferential fingers 1912 engage the protrusion 1526 at a desired maximum installation depth of the shaft 1514. For example, where a thread pitch of the helical thread 1516 corresponds to three full rotations of the shaft 1514 for complete installation of the shaft 1514 into the mounting surface 2100, the thread guides 1528 have a height that places the knuckle portion 1913 of the flexible portions 1912 directly over the protrusion 1526 when the frangible portions 1822 have broken and the self-drilling tip 1828 has started to engage the mounting surface 2100, and thus, after the three full rotations, the knuckle portion 1913 engages and abuts the protrusion 1526.

It can be seen from the foregoing that various embodiments of an anchor fastener have been described. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An anchor fastener comprising:
    a head, a generally cylindrical shaft extending from the head, a base at a distal end of the shaft, and at least one frangible portion configured to frangibly connect the shaft to the base;
    the shaft including a helical thread that extends along an outer surface of the shaft towards the distal end of the shaft;
    wherein the at least one frangible portion is separable from at least one of the base and the shaft under application of a force to the shaft;
    wherein the base includes a distal surface and an engagement portion configured to engage an object to be anchored to a mounting surface and configured to hold the anchor fastener to the object before installation of the shaft through the object and into the mounting surface;
    wherein the base includes a thread guide configured to support the helical thread during installation of the shaft;
    wherein the thread guide has a plurality of engagement surfaces that engage the helical thread during installation and are formed at different distances from the base according to a thread pitch of the helical thread.

2. The anchor fastener of claim 1, wherein the force is a rotational installation force that causes i) a separation of the at least one frangible portion, ii) a self-drilling tip of the shaft to engage and drill into the mounting surface, and iii) installation of the shaft into the mounting surface.

3. The anchor fastener of claim 1, wherein the thread guide is configured to stabilize a rotational axis of shaft during installation of the shaft.

4. The anchor fastener of claim 1, wherein the plurality of engagement surfaces include at least three engagement surfaces that extend inwards from the base towards respective frangible portions that frangibly connect the shaft to the base.

5. The anchor fastener of claim 1, wherein:
    the head includes a flexible portion configured to flex away from the base and in a direction parallel to the shaft;
    the base includes a protrusion that protrudes towards the flexible portion of the head;
    the flexible portion is configured to engage the protrusion and flex to resist and slow rotation of the shaft.

6. The anchor fastener of claim 5, wherein the flexible portion includes elongated circumferential fingers that flex away from a proximal surface of the base.

7. The anchor fastener of claim 6, wherein the elongated circumferential fingers include four elongated circumferential fingers arranged in a plane perpendicular to the shaft.

8. The anchor fastener of claim 6, wherein the protrusion is configured to prevent further rotation of the shaft at a predetermined installation depth of the shaft.

9. The anchor fastener of claim 8, wherein a height of the thread guides is set based on a height of the protrusion from the base and a rotation of the flexible portions during the installation so that the elongated circumferential fingers engage the protrusion at a desired maximum installation depth of the shaft.

10. The anchor fastener of claim 1, wherein the base includes an engagement portion that prevents rotation of the base relative to the object to be anchored.

11. The anchor fastener of claim 10, wherein the engagement portion is a flat portion that engages a corresponding notch in the object to be anchored.

12. The anchor fastener of claim 1, wherein the head of the anchor fastener has a receptacle configured to receive a driving device for at least one of installation and removal of the anchor fastener.

13. An anchor fastener comprising:
    a head, a threaded shaft extending from the head having a self-drilling tip, a base at a distal end of the shaft, and at least one frangible portion configured to frangibly connect the shaft to the base;

the shaft including a helical thread that extends along an outer surface of the shaft towards the distal end of the shaft;

wherein the at least one frangible portion is separable from at least one of the base and the shaft under application of a force to the shaft;

wherein the base includes a distal surface and an engagement portion configured to engage an object to be anchored to a mounting surface and configured to hold the anchor fastener to the object before installation of the shaft through the object and into the mounting surface;

wherein the head includes a flexible portion configured to flex away from the base and in a direction perpendicular to the shaft;

the base includes a protrusion that protrudes towards the flexible portion of the head;

the flexible portion is configured to engage the protrusion and flex to resist and slow rotation of the shaft during installation of the shaft.

14. The anchor fastener of claim 13, wherein the force is a rotational installation force that causes i) a separation of the at least one frangible portion, ii) a self-drilling tip of the shaft to engage and drill into the mounting surface, and iii) installation of the shaft into the mounting surface.

15. The anchor fastener of claim 13, wherein the base includes a thread guide configured to support the helical thread during installation of the shaft;

wherein the thread guide is configured to stabilize a rotational axis of shaft during installation of the shaft;

wherein the thread guide has a plurality of engagement surfaces that engage the helical thread during installation and are formed at different distances from the base according to a thread pitch of the helical thread.

16. The anchor fastener of claim 13, wherein the flexible portion includes elongated circumferential fingers that flex away from a proximal surface of the base.

17. The anchor fastener of claim 16, wherein the elongated circumferential fingers include four elongated circumferential fingers arranged in a plane perpendicular to the shaft.

18. The anchor fastener of claim 16, wherein the protrusion is configured to prevent further rotation of the shaft at a predetermined installation depth of the shaft.

19. The anchor fastener of claim 18, wherein a height of the thread guides is set based on a height of the protrusion from the base and a rotation of the flexible portions during the installation so that the elongated circumferential fingers engage the protrusion at a desired maximum installation depth of the shaft.

* * * * *